(12) United States Patent
Fox-Rabinovitz et al.

(10) Patent No.: US 12,431,003 B2
(45) Date of Patent: Sep. 30, 2025

(54) SYSTEMS AND METHODS FOR DETECTING CARGO LOST FROM AN AUTONOMOUS VEHICLE

(71) Applicant: Torc Robotics, Inc., Blacksburg, VA (US)

(72) Inventors: Joseph R. Fox-Rabinovitz, Blacksburg, VA (US); Armenio Rivero, Blacksburg, VA (US); Akshay Pai Raikar, Blacksburg, VA (US); William Davis, Blacksburg, VA (US); Pablo Smith, Blacksburg, VA (US); Walter Grigg, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 94 days.

(21) Appl. No.: 18/408,360

(22) Filed: Jan. 9, 2024

(65) Prior Publication Data
US 2025/0225857 A1 Jul. 10, 2025

(51) Int. Cl.
| | |
|---|---|
| *B60Q 1/00* | (2006.01) |
| *B60T 8/17* | (2006.01) |
| *B60T 8/18* | (2006.01) |
| *B60W 10/08* | (2006.01) |
| *G01G 19/03* | (2006.01) |
| *G01M 1/12* | (2006.01) |
| *G08B 21/24* | (2006.01) |

(52) U.S. Cl.
CPC ............ *G08B 21/24* (2013.01); *B60T 8/1708* (2013.01); *B60T 8/18* (2013.01); *B60W 10/08* (2013.01); *G01G 19/03* (2013.01); *G01M 1/122* (2013.01); *B60T 2250/02* (2013.01)

(58) Field of Classification Search
CPC ......... G08B 21/24; B60T 8/1708; B60T 8/18; B60T 2250/02; B60W 10/08; G01G 19/03; G01M 1/122
USPC ........................................................ 340/457
See application file for complete search history.

(56) References Cited

U.S. PATENT DOCUMENTS

| | | | |
|---|---|---|---|
| 2018/0129222 A1* | 5/2018 | Anderson | G06V 20/59 |
| 2020/0004261 A1* | 1/2020 | Kim | B60W 60/00186 |
| 2022/0155784 A1 | 5/2022 | Bowen | |

* cited by examiner

*Primary Examiner* — Tai T Nguyen
(74) *Attorney, Agent, or Firm* — McCarter & English, LLP (57) ABSTRACT

A method for detecting and reporting cargo lost from an autonomous vehicle. The method includes receiving, from a plurality of sensors, at least one sensor signal representing one or more measurements of the vehicle, determining a mass of the vehicle based on the one or more measurements, estimating a center of mass along a longitudinal axis of the vehicle based on the one or more measurements and the mass, and receiving, from the plurality of sensors, at least one sensor signal representing one or more cargo loss-related conditions. The method also includes identifying one or more cargo loss-indicative conditions based on the center of mass estimation and the one or more cargo loss-related conditions, generating a lost cargo detection signal based on at least one of the one or more cargo loss-indicative conditions and a location of the vehicle, and transmitting the lost cargo detection signal to an external receiver.

20 Claims, 4 Drawing Sheets

SYSTEMS AND METHODS FOR DETECTING CARGO LOST FROM AN AUTONOMOUS VEHICLE

TECHNICAL FIELD

The field of the disclosure relates generally to autonomous vehicles and, more specifically, to systems and methods for use in detecting and reporting cargo lost from an autonomous vehicle using sensor data of center of mass estimations and of conditions surrounding the autonomous vehicle.

BACKGROUND OF THE INVENTION

At least some known autonomous vehicles may implement four fundamental technologies in their autonomy software system: perception, localization, behaviors and planning, and motion control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies may process features in the sensed environment to correlate, or register, those features to known features on a map. Additionally, localization technologies may use data received from sensors and/or various odometry information sources to generate an estimated vehicle location in the world.

Behaviors and planning technologies determine how to move through the sensed environment to reach a planned destination, processing data representing the sensed environment and localization or mapping data to plan maneuvers and routes to reach the planned destination. Motion control technologies translate the output of behaviors and planning technologies into concrete commands to the vehicle via the vehicle interface provided by the internal electronic control unit (ECU).

One element of perception for autonomous vehicles is collection and analysis of measurements of the autonomous vehicle itself. During operation, measurements of the autonomous vehicle may be taken to verify that continued operation of the vehicle is safe. For example, one or more measurements may be collected to determine a mass of the autonomous vehicle and to estimate a center of mass along a longitudinal axis of the autonomous vehicle, such as, but not limited to, as described in U.S. patent application Ser. No. 18/235,787, entitled Systems and Methods of Monitoring and Control For Trailer Dynamics, filed Aug. 18, 2023, which is hereby incorporated by reference in its entirety.

Another element of perception for autonomous vehicles is detection and identification of conditions within and/or surrounding the autonomous vehicle. During operation, a condition may be detected by the autonomous vehicle that may make further operation of the autonomous vehicle unsafe. For example, a cargo loss-related condition may be detected within the autonomous vehicle and/or in an area surrounding the autonomous vehicle, such as proximate a trailer of the vehicle, to indicate cargo may have been lost from the trailer of the vehicle. However, without appropriate behaviors and planning input into motion control, an autonomous vehicle that collects these measurements and/or detects these conditions may be unable to safely continue movement towards a planned destination. Accordingly, there exists a need for systems and methods for detecting and reporting cargo lost from an autonomous vehicle using sensor data of center of mass estimations and of conditions surrounding the autonomous vehicle.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

The embodiments described herein relate to a system for detecting and reporting cargo lost from an autonomous vehicle. The autonomous vehicle is oriented along a longitudinal axis and includes a cab, a trailer connectable to the cab, a front wheel set supporting the cab, and a back wheel set supporting the trailer. The system includes a cargo loss detection system comprising a plurality of sensors, a drive system configured to move the autonomous vehicle, and an autonomy system. The autonomy system includes a processor and a memory device, the memory device storing instructions that when executed by the processor cause the processor to receive, from the plurality of sensors, at least one sensor signal representing one or more measurements of the autonomous vehicle, determine a mass of the autonomous vehicle based on the one or more measurements, estimate a center of mass along the longitudinal axis of the autonomous vehicle based on the one or more measurements and the mass, receive, from the plurality of sensors, at least one sensor signal representing one or more cargo loss-related conditions, identify one or more cargo loss-indicative conditions based on the center of mass estimation and the one or more cargo loss-related conditions, generate a lost cargo detection signal based on at least one of the one or more cargo loss-indicative conditions and a location of the autonomous vehicle, and transmit the lost cargo detection signal to an external receiver.

The embodiments described herein also relate to a method for detecting and reporting cargo lost from an autonomous vehicle. The method includes receiving, from a plurality of sensors, at least one sensor signal representing one or more measurements of the autonomous vehicle, determining a mass of the autonomous vehicle based on the one or more measurements, and estimating a center of mass along a longitudinal axis of the autonomous vehicle based on the one or more measurements and the mass. The method also includes receiving, from the plurality of sensors, at least one sensor signal representing one or more cargo loss-related conditions, and identifying one or more cargo loss-indicative conditions based on the center of mass estimation and the one or more cargo loss-related conditions. The method further includes generating a lost cargo detection signal based on at least one of the one or more cargo loss-indicative conditions and a location of the autonomous vehicle and transmitting the lost cargo detection signal to an external receiver.

The embodiments described herein further relate to an autonomy system for detecting and reporting cargo lost from an autonomous vehicle. The autonomy system includes a processor and a memory device, the memory device storing instructions that when executed by the processor cause the processor to receive, from a plurality of sensors, at least one sensor signal representing one or more measurements of the autonomous vehicle, determine a mass of the autonomous vehicle based on the one or more measurements, estimate a center of mass along a longitudinal axis of the autonomous vehicle based on the one or more measurements and the mass, receive, from the plurality of sensors, at least one sensor signal representing one or more cargo loss-related conditions, identify one or more cargo loss-indicative conditions based on the center of mass estimation and the one or more cargo loss-related conditions, generate a lost cargo detection signal based on at least one of the one or more cargo loss-indicative conditions and a location of the autonomous vehicle, and transmit the lost cargo detection signal to an external receiver.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

Figure 1:
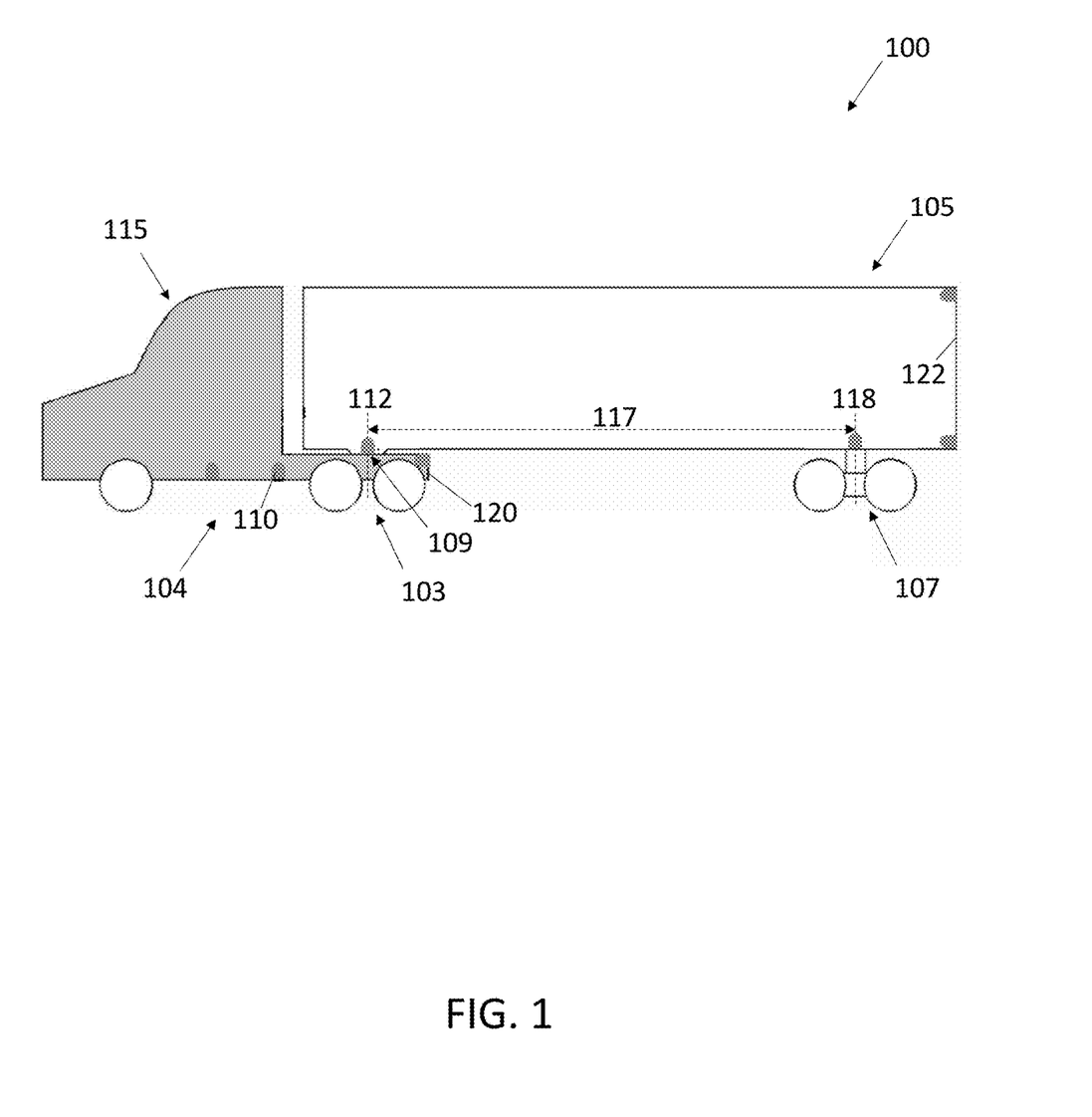
FIG. 1 is a side view of a vehicle including an embodiment of a cargo loss detection system.

FIG. 1 is a side view of a vehicle 100. The vehicle 100 is configured for autonomous operation via an autonomy system 102 (shown in FIG. 2). The vehicle 100 includes a trailer 105, a cab 115 connectable to the trailer 105, a front wheel set 103 to support the cab 115, and a back wheel set 107 to support the trailer 105. The vehicle 100 also includes a cargo loss detection system 104 for collecting measurements of the vehicle 100, including, but not limited to, mass measurements and/or distance measurements, and for perceiving conditions within and/or surrounding the vehicle 100, including, but not limited to, cargo loss-related conditions and/or cargo loss-indicative conditions. The autonomy system 102 may be used to control the vehicle 100 based on the cargo loss-related conditions and/or the cargo loss-indicative conditions, such as to control movement of the vehicle 100, plan movement of the vehicle 100, and/or transmit a lost cargo detection signal to an external receiver.

The cargo loss detection system 104 includes a plurality of sensors 110 to collect measurements of the vehicle 100, such as, but not limited to, a mass measurement and a distance measurement, and to detect cargo loss-related conditions within and/or in an area surrounding the vehicle 100, such as, but not limited to, a longitudinal center of mass shift, a drive system torque amount, a trailer weight amount, an object detection threshold, and a light amount. The plurality of sensors 110 may be any sensor known in the art that facilitates the collection of data as related to the cargo loss detection system 104. For example, the plurality of sensors 110 may include, but are not limited to, one or more cameras, one or more radar sensors, one or more LiDAR sensors, one or more pressure sensors, one or more smart valves, one or more tire pressure sensors, one or more scales, one or more engine torque sensors, and/or one or more fuel level sensors.

The plurality of sensors 110 may be positioned at any point along the vehicle 100 to collect mass measurements of the vehicle 100. For example, the plurality of sensors 110 may measure collect a mass measurement of the cab 115 of the vehicle 100, and/or a mass measurement of the trailer 105 of the vehicle 100. The plurality of sensors 110 may be used to collect mass measurements at each of the front and back wheel sets 103, 107 to determine the weight on each support of the vehicle 100. The positioning of the sensors 110 in FIG. 1 is intended to be illustrative, and is therefore not meant to be limiting.

Additionally, the plurality of sensors 110 may be oriented proximate the front wheel set 103 and/or the back wheel set 107 of the vehicle 100 to collect distance measurements of the vehicle 100. For example, the plurality of sensors 110 may be oriented along a cab-trailer connection axis 112 at a connection 109 between the cab 115 and the trailer 105 at a center point of the front wheel set 103, along a wheel base axis 118 at a center point of the back wheel set 107, and/or proximate to a back cab end 120 of the cab 115 proximate the front wheel set 103 to collect a distance measurement between the front and back wheel sets 103, 107 of the vehicle 100. The distance measurement between the front and back wheel sets 103, 107 may be a distance 117 as measured between the cab-trailer connection axis 112 at the center point of the front wheel set 103 and the wheel base axis 118 at the center point of the back wheel set 107. The plurality of sensors 110 oriented proximate the front and/or back wheel sets 103, 107 of the vehicle 100 may be positioned at any point proximate the front and back wheel sets 103, 107. That is, the positioning of the sensors 110 in FIG. 1 is intended to be illustrative, and is therefore not meant to be limiting.

Furthermore, the plurality of sensors 110 may be oriented proximate a back trailer end 122 of the trailer 105 to detect cargo loss-related conditions, such as an opening of one or more doors of the trailer 105 and/or objects detected behind the vehicle 100. For example, the plurality of sensors 110 may be positioned on and/or proximate to the back trailer end 122 of the trailer 105 to detect an opening and/or a swinging of one or more doors of the trailer 105. Additionally, for example, the plurality of sensors 110 may be positioned on and/or proximate to the back trailer end 122 of the trailer 105 and oriented outwards from the back trailer end 122 to collect signal data exterior to the vehicle 100, such as, but not limited to, behind the vehicle 100.

Figure 2:
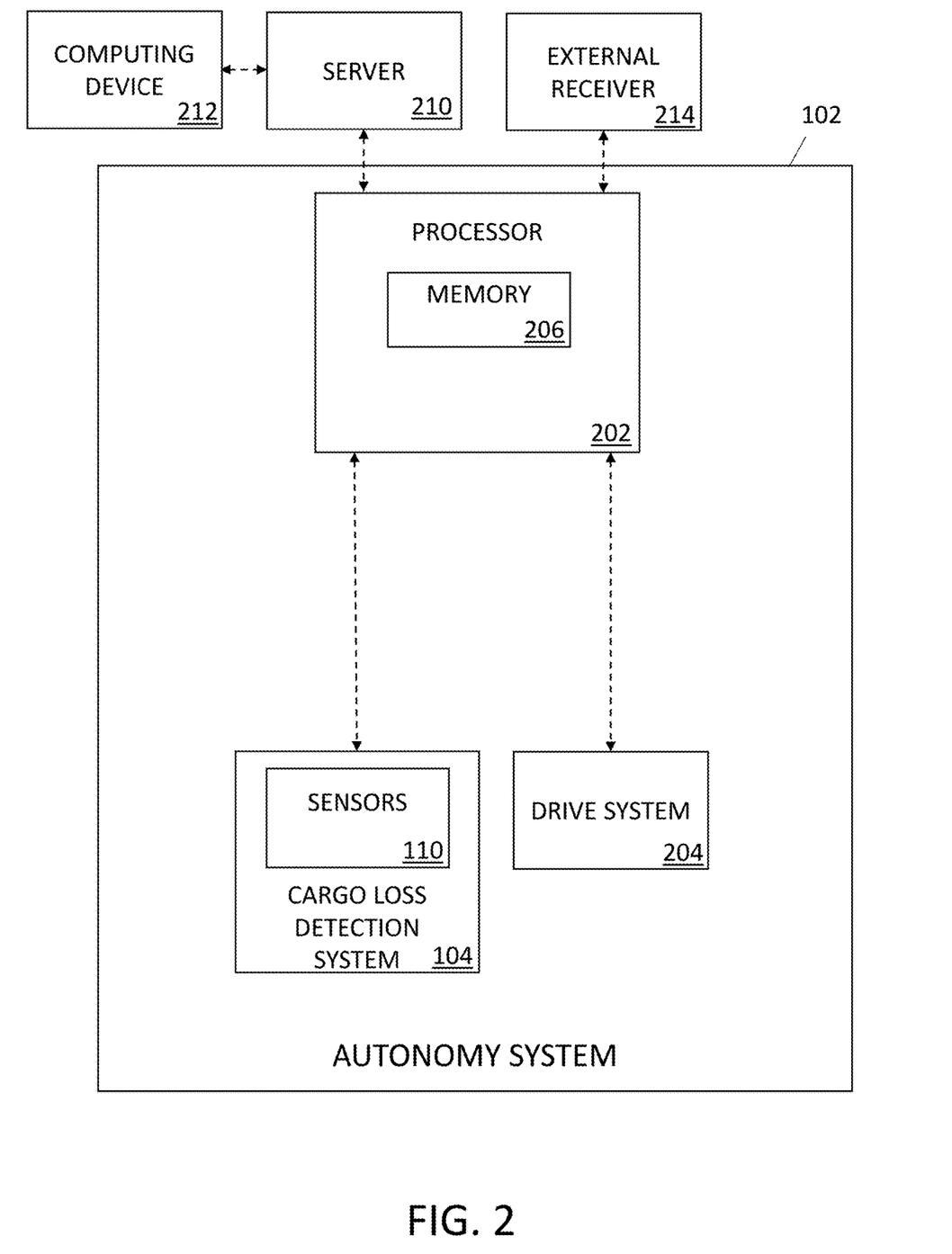
FIG. 2 is a schematic of an autonomy system for use with a vehicle including a cargo loss detection system.

FIG. 2 is a schematic of the autonomy system 102 for use with the vehicle 100. The autonomy system 102 may be used with any embodiment of the cargo loss detection system 104 as described herein. The autonomy system 102 includes a processor 202 in communication with the cargo loss detection system 104. The processor 202 may also be in communication with a drive system 204 to autonomously control movement of the vehicle 100. The processor 202 may be one or more processing systems. The processor 202 includes a memory 206. The memory 206 may be any device allowing information such as executable instructions and/or data to be stored and retrieved. The processor 202 may include one or more processing units to retrieve and execute instructions and/or data stored by the memory 206.

The autonomy system 102 may use signals received from the plurality of sensors 110 of the cargo loss detection system 104 to control the drive system 204. Additionally, the autonomy system 102 may use signals received from a server 210. The server 210 may be in communication with a computing device 212, such as, but not limited to, a user computing device (such as for manual remote control of the cargo loss detection system 104 and/or the drive system 204) and/or another vehicle in communication with the vehicle 100 to send and/or receive signals between vehicles.

The autonomy system 102 may determine a mass of the vehicle 100 based on the one or more measurements of the vehicle 100, such as, but not limited to, the mass measurement of the cab 115 and/or the mass measurement of the trailer 105. The mass of the vehicle 100 may be determined based on a measured torque of an engine of the vehicle 100. Additionally, the autonomy system 102 may estimate a center of mass of the vehicle 100 along a longitudinal axis of the vehicle 100 based on the one or more measurements of the vehicle, such as, but not limited to, the distance between the front and back wheel sets 103, 107, and the mass of the vehicle. In some embodiments, the autonomy system 102 may determine other characteristics of the vehicle 100 based on the one or more measurements of the vehicle 100, such as a longitudinal mass distribution of the vehicle 100 and/or an impeded engine driveshaft. For example, the autonomy system 102 may determine the engine driveshaft of the vehicle 100 is impeded based on a measured constant increase in the mass of the vehicle 100, as measured based on the torque on the engine of the vehicle 100.

Additionally, the autonomy system 102 may control the generation and transmission of a lost cargo detection signal based on the one or more cargo loss-related conditions identified within and/or surrounding the vehicle 100. For example, the generation and transmission of the lost cargo detection signal may signify the occurrence of a cargo loss event and may be based on a variable relationship as determined by the processor 202 based on at least two of a mass of the vehicle (such as based on a measured torque of an engine of the vehicle), a center of mass of the vehicle, and a time.

Figure 3A:
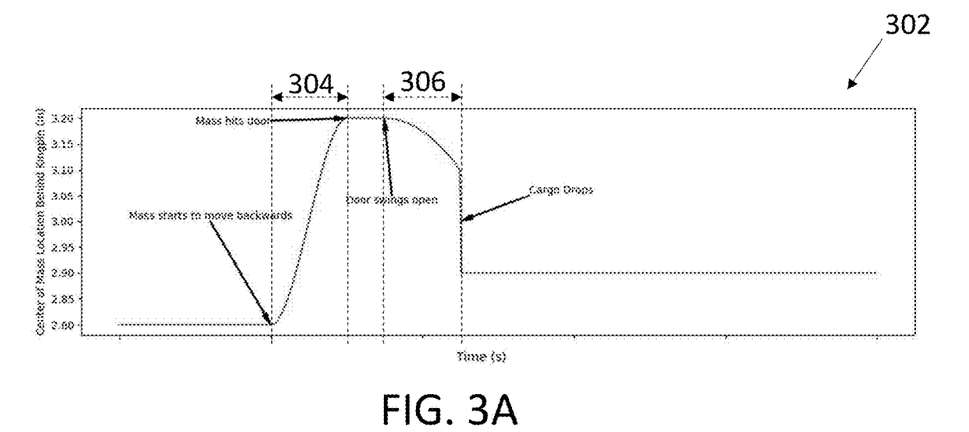
FIG. 3A is an embodiment of a graphical representation of a change in a center of mass of a vehicle including a cargo loss detection system during a cargo loss event, the vehicle including a trailer with an overhead door.

As shown in FIG. 3A, the processor may determine a change in the positioning of a center of mass as illustrated by variable relationship 302, including, but not limited to, a rapid increase 304, from the time at which the center of mass starts to move backwards to the time at which the center of mass reaches the door at the back of the trailer 105, followed by a decrease 306, from the time the door at the back of the trailer 105 swings open to the time at which the cargo drops from the trailer 105. The position of the center of mass may be in reference to the connection 109 between the cab 115 and the trailer 105. The variable relationship 302 may correspond to the trailer 105 having an overhead door, with the decrease 306 being caused by the overhead door sliding up and forward. The variable relationship 302 is illustrated as an idealized representation, not showing the effects of noise from any of a plurality of sources, and thus, is intended to be illustrative.

Figure 3B:
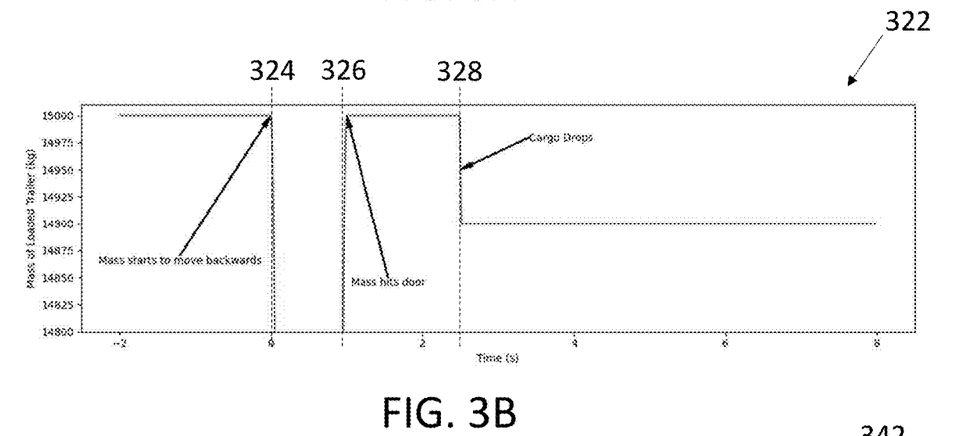
FIG. 3B is an embodiment of a graphical representation of a change in a mass of a vehicle including a cargo loss detection system during a cargo loss event.

As shown in FIG. 3B, the processor may determine a change in a mass of the trailer as illustrated by variable relationship 322, including, but not limited to, a nearly instant drop 324, at the time at which the mass of the trailer starts to move backwards, followed by a nearly instant spike 326, at the time at which the mass of the trailer reaches the one or more doors at the back of the trailer 105, and a nearly instant decrease 328, at the time at which the cargo drops from the trailer 105. The variable relationship 322 is illustrated as an idealized representation, not showing the effects of noise from any of a plurality of sources, and thus, is intended to be illustrative.

Figure 3C:
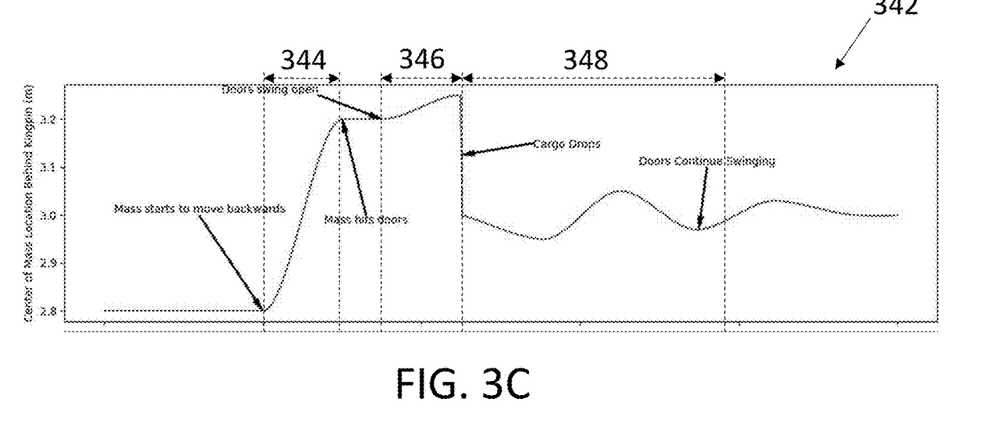
FIG. 3C is another embodiment of a graphical representation of a change in a center of mass of a vehicle including a cargo loss detection system during a cargo loss event, the vehicle including a trailer with one or more swinging doors.

As shown in FIG. 3C, the processor may determine a change in the positioning of a center of mass as illustrated by variable relationship 342, including, but not limited to, a rapid increase 344, from the time at which the center of mass starts to move backwards to the time at which the center of mass reaches the one or more doors at the back of the trailer 105, followed by a gradual increase 346 from the time at which the one or more doors at the back of the trailer 105 swing open to the time at which the cargo drops from the trailer 105, and a sinusoidal-like wave 348 as the one or more doors at the back of the trailer continue to swing. The position of the center of mass may be in reference to the connection 109 between the cab 115 and the trailer 105. The variable relationship 342 may correspond to the trailer 105 having one or more swinging doors. The variable relationship 342 is illustrated as an idealized representation, not showing the effects of noise from any of a plurality of sources, and thus, is intended to be illustrative.

Additionally, for example, the generation and transmission of the lost cargo detection signal may be based on one or more cargo loss-indicative conditions within and/or surrounding the vehicle 100, as identified by the processor 202 based on the one or more cargo loss-related conditions. The processor 202 may compare the detected data to threshold data stored in the memory 206 to identify cargo loss-indicative conditions included in the detected cargo loss-related conditions, such as, but not limited to, a center of mass shift, a center of mass shift speed, a trailer mass shift, a trailer mass shift speed, an object type, an object velocity, and an object height. The lost cargo detection signal may include a time stamp, a location of the vehicle 100, the one or more cargo loss-related conditions, and the one or more cargo loss-indicative conditions.

Upon identification of one or more cargo loss-indicative conditions surrounding the vehicle 100, the autonomy system 102 may control the generation of the lost cargo detection signal to alert a local authority and/or a control center of the cargo lost from the vehicle 100. The autonomy system 102 may also control the transmission of the lost cargo detection signal to an external receiver 214. The external receiver 214 may be a local authority and/or a control center configured for further signal dissemination to the local authority.

The autonomy system 102 may also control the motion and/or the motion planning of the vehicle 100 by the drive system 204. For example, the autonomy system 102 may determine a hazard-response position for the vehicle 100 based on the cargo loss-indicative conditions for safe operation of the vehicle 100 while the lost cargo detection signal is generated and transmitted, such as, but not limited to, a nearby shoulder and/or median of a road and/or a right-most lane of a road. Additionally, for example, the autonomy system 102 may maintain the vehicle 100 in the hazard-response position while a separate vehicle (such as, but not limited to, a drone) is dispatched to pick up the cargo lost from the vehicle 100.

Figure 4:
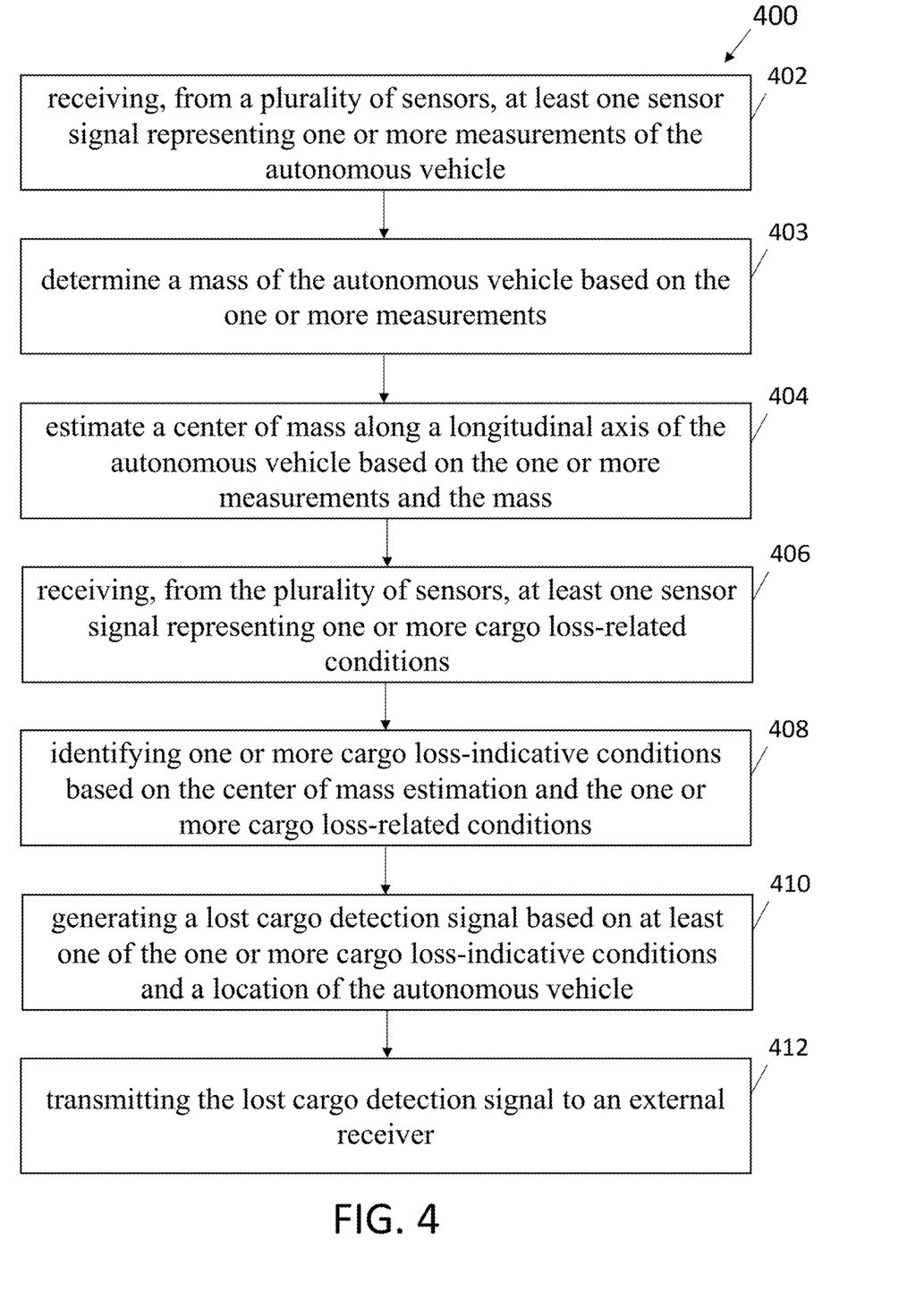
FIG. 4 is a flow diagram of a method for detecting and reporting cargo lost from a vehicle.

FIG. 4 is a flowchart of a method 400 for detecting and reporting cargo lost from an autonomous vehicle, such as the vehicle 100. The method 400 includes receiving 402, from a plurality of sensors (such as the plurality of sensors 110), at least one sensor signal representing one or more measurements of the autonomous vehicle, determining 403 a mass of the autonomous vehicle based on the one or more measurements, and estimating 404 a center of mass along a longitudinal axis of the autonomous vehicle based on the one or more measurements and the mass. The method 400 also includes receiving 406, from the plurality of sensors, at least one sensor signal representing one or more cargo loss-related conditions, and identifying 408 one or more cargo loss-indicative conditions based on the center of mass estimation and the one or more cargo loss-related conditions. The method 400 further includes generating 410 a lost cargo detection signal based on at least one of the one or more cargo loss-indicative conditions and a location of the autonomous vehicle, and transmitting 412 the lost cargo detection signal to an external receiver.

Some embodiments involve the use of one or more electronic processing or computing devices. As used herein, the terms "processor" and "computer" and related terms, e.g., "processing device," "computing device," and "processor" are not limited to just those integrated circuits referred to in the art as a computer, but broadly refers to a processors, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or a electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable, and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

The invention claimed is:

1. A system for detecting and reporting cargo lost from an autonomous vehicle, the autonomous vehicle being oriented along a longitudinal axis and comprising a cab, a trailer connectable to the cab, a front wheel set supporting the cab, and a back wheel set supporting the trailer, the system comprising:
   a cargo loss detection system comprising a plurality of sensors;
   a drive system configured to move the autonomous vehicle; and
   an autonomy system, the autonomy system including a processor and a memory device, the memory device storing instructions that when executed by the processor cause the processor to:
      receive, from the plurality of sensors, at least one sensor signal representing one or more measurements of the autonomous vehicle;
      determine a mass of the autonomous vehicle based on the one or more measurements;
      estimate a center of mass along the longitudinal axis of the autonomous vehicle based on the one or more measurements and the mass;
      receive, from the plurality of sensors, at least one sensor signal representing one or more cargo loss-related conditions;
      identify one or more cargo loss-indicative conditions based on the center of mass estimation and the one or more cargo loss-related conditions;
      generate a lost cargo detection signal based on at least one of the one or more cargo loss-indicative conditions and a location of the autonomous vehicle; and
      transmit the lost cargo detection signal to an external receiver.

2. The system of claim 1, wherein the one or more measurements comprise at least one of a total vehicle weight of the autonomous vehicle, a trailer weight of the trailer of the autonomous vehicle, and a wheel distance between the front and back wheel sets of the autonomous vehicle.

3. The system of claim 2, wherein the trailer weight is measured at a connection point between the cab and the trailer of the autonomous vehicle.

4. The system of claim 1, wherein the one or more cargo loss-related conditions comprise at least one of a longitudinal shift in the center of mass estimation, a drive system torque threshold, and a trailer weight threshold.

5. The system of claim 1, wherein the plurality of sensors comprise at least one of a camera and a LiDAR sensor configured for visual detection of the one or more cargo loss-indicative conditions, the one or more cargo loss-indicative conditions comprising at least one of an object detection threshold and a light amount.

6. The system of claim 5, wherein the at least one of the camera and the LiDAR sensor is oriented outwards from a back exterior surface of the trailer of the autonomous vehicle.

7. The system of claim 1, wherein the processor is further caused to identify an engine driveshaft impedance condition based on a constant increase in the mass of the vehicle.

8. The system of claim 1, wherein the processor is further caused to control the drive system to move the autonomous vehicle into a hazard-response position.

9. The system of claim 8, wherein the hazard-response position comprises the autonomous vehicle being stopped in or proximate to one of a road shoulder and a right-most road lane.

10. A method for detecting and reporting cargo lost from an autonomous vehicle, the method comprising:
   receiving, from a plurality of sensors, at least one sensor signal representing one or more measurements of the autonomous vehicle;
   determining a mass of the autonomous vehicle based on the one or more measurements;
   estimating a center of mass along a longitudinal axis of the autonomous vehicle based on the one or more measurements and the mass;
   receiving, from the plurality of sensors, at least one sensor signal representing one or more cargo loss-related conditions;
   identifying one or more cargo loss-indicative conditions based on the center of mass estimation and the one or more cargo loss-related conditions;
   generating a lost cargo detection signal based on at least one of the one or more cargo loss-indicative conditions and a location of the autonomous vehicle; and
   transmitting the lost cargo detection signal to an external receiver.

11. The method of claim 10, wherein receiving the at least one sensor signal representing one or more measurements comprises receiving at a sensor signal representing at least one of a total vehicle weight of the autonomous vehicle, a trailer weight of a trailer of the autonomous vehicle, and a wheel distance between front and back wheel sets of the autonomous vehicle.

12. The method of claim 11, wherein receiving the sensor signal representing the trailer weight of the trailer is measured at a connection point between a cab and the trailer of the autonomous vehicle.

13. The method of claim 10, wherein receiving the at least one sensor signal representing one or more cargo loss-related conditions comprises receiving a sensor signal representing at least one of a longitudinal shift in the center of mass estimation, a drive system torque threshold, and a trailer weight threshold.

14. The method of claim 10, wherein the at least one sensor signal representing one or more cargo loss-related conditions is received by a camera configured for visual detection of the one or more cargo loss-indicative conditions, the one or more cargo loss-indicative conditions comprising at least one of an object detection threshold and a light amount.

15. The method of claim 14, wherein receiving the at least one sensor signal representing one or more cargo loss-related conditions comprises receiving the at least one sensor signal by a camera oriented outwards from a back exterior surface of a trailer of the autonomous vehicle.

16. The method of claim 10, further comprising controlling a drive system to move the autonomous vehicle into a hazard-response position.

17. The method of claim 16, wherein controlling the drive system to move the autonomous vehicle into the hazard-response position comprises stopping the autonomous vehicle stopped in or proximate to one of a road shoulder and a right-most road lane.

18. An autonomy system for detecting and reporting cargo lost from an autonomous vehicle, the autonomy system comprising a processor and a memory device, the memory device storing instructions that when executed by the processor cause the processor to:
   receive, from a plurality of sensors, at least one sensor signal representing one or more measurements of the autonomous vehicle;
   determine a mass of the autonomous vehicle based on the one or more measurements;
   estimate a center of mass along a longitudinal axis of the autonomous vehicle based on the one or more measurements and the mass;
   receive, from the plurality of sensors, at least one sensor signal representing one or more cargo loss-related conditions;
   identify one or more cargo loss-indicative conditions based on the center of mass estimation and the one or more cargo loss-related conditions;
   generate a lost cargo detection signal based on at least one of the one or more cargo loss-indicative conditions and a location of the autonomous vehicle; and
   transmit the lost cargo detection signal to an external receiver.

19. The autonomy system of claim 18, wherein the one or more cargo loss-related conditions comprise at least one of a longitudinal shift in the center of mass estimation, a drive system torque threshold, and a trailer weight threshold.

20. The autonomy system of claim 18, wherein the processor is further caused to control a drive system to move the autonomous vehicle into a hazard-response position.

* * * * *